United States Patent [19]

El-Hamamsy et al.

[11] Patent Number: 5,075,600
[45] Date of Patent: Dec. 24, 1991

[54] PIEZOELECTRICALLY ACTUATED VARIABLE CAPACITOR

[75] Inventors: Sayed-Amr A. El-Hamamsy; Joseph C. Borowiec, both of Schenectady, N.Y.

[73] Assignee: General Electric Company, Schenectady, N.Y.

[21] Appl. No.: 534,574

[22] Filed: Jun. 7, 1990

[51] Int. Cl.[5] .......................................... H05B 41/24
[52] U.S. Cl. ............................... 315/248; 315/227 R; 361/277; 361/290
[58] Field of Search ............. 315/248, 227 R, 209 PZ; 361/277, 290

[56] References Cited

U.S. PATENT DOCUMENTS

| | | | |
|---|---|---|---|
| 2,588,513 | 3/1952 | Giacoletto | 361/290 X |
| 3,646,413 | 2/1972 | Oomen | 361/290 X |
| 4,312,025 | 1/1982 | Boyer | 361/290 X |
| 4,390,813 | 6/1983 | Stanley | 315/248 |
| 4,716,331 | 12/1987 | Higgins, Jr. | 361/290 X |
| 4,783,615 | 11/1988 | Dakin | 315/248 |
| 4,810,938 | 3/1989 | Johnson et al. | 315/248 |
| 4,812,702 | 3/1989 | Anderson | 313/153 |
| 4,894,589 | 1/1990 | Borowiec | 315/248 |
| 4,894,590 | 1/1990 | Witting | 315/248 |
| 4,902,937 | 2/1990 | Witting | 315/248 |
| 4,910,439 | 3/1990 | El-Hamamsy et al. | 315/248 |

*Primary Examiner*—Eugene R. LaRoche
*Assistant Examiner*—Do Hyun Yoo
*Attorney, Agent, or Firm*—Jill M. Breedlove; James C. Davis, Jr.; Marvin Snyder

[57] ABSTRACT

A variable capacitor includes a fixed conductive plate and a movable conductive plate with a dielectric disposed between them. A piezoelectric actuator is used to vary the distance between the conductive plates by moving the movable plate with respect to the fixed plate, with capacitance changing in inverse proportion to distance moved. In an electrodeless high intensity discharge lamp ballast, such a variable capacitor is situated in series with the excitation coil of the lamp. When a control voltage is applied to the piezoelectric actuator, the movable plate is moved from a starting position to a running position so as to maintain the ballast load in tune under both starting and running conditions, respectively, resulting in higher efficiency operation.

20 Claims, 4 Drawing Sheets

PIEZOELECTRICALLY ACTUATED VARIABLE CAPACITOR

FIELD OF THE INVENTION

The present invention relates generally to a capacitor having a capacitance which is varied by a piezoelectric actuator. More particularly, the present invention relates to such a variable capacitor which is useful for automatically tuning the ballast load circuit of an electrodeless HID lamp system as the output impedance thereof changes between starting and running conditions.

BACKGROUND OF THE INVENTION

Many circuits require automatic tuning capability in order to be practicable. One way to accomplish automatic circuit tuning is to use one or more variable capacitors. In low power circuits, for example, a varactor, which comprises a semiconductor device having a junction capacitance that varies with bias voltage, is often used for automatic tuning. Alternatively, for both low and high power applications, mechanical actuators (e.g. stepper motors) with feedback may be used to vary capacitance. The latter solution, however, is generally too costly and hence not practical for many applications.

In electrodeless high intensity discharge (HID) lamp ballasts, for example, automatic tuning is desirable because the output impedance of the ballast changes when a transition is made between starting and running conditions. In an electrodeless HID lamp, an arc discharge is generated by establishing a solenoidal electric field in a gas contained within an arc tube. In particular, the solenoidal electric field is created by the time-varying magnetic field of an excitation coil which is disposed about the arc tube To maximize efficiency of an HID lamp, the degree of coil coupling between the magnetic field and the arc discharge must be maximized. Since the degree of coupling increases with frequency, electronic ballasts used to drive HID lamps operate at high frequencies in the range from 0.1 to 30 MHz, exemplary operating frequencies being 13.56 and 6.78 MHz. These exemplary frequencies are within the industrial, scientific, and medical (ISM) band of the electromagnetic spectrum in which moderate amounts of electromagnetic radiation are permissible; and such radiation is generally emitted by an electrodeless HID lamp system.

Operation of an HID lamp ballast at the series resonant frequency of the load circuit maximizes power output. However, operation at a frequency slightly higher than the series resonant frequency of the load circuit maximizes ballast efficiency. Hence, for maximum efficiency, operation is slightly "off" resonance, and a specific ballast load resistance and phase angle are required. To this end, the impedance of the ballast load, including that of the arc discharge as reflected into the ballast load, must be matched to the required ballast load resistance and phase angle. As described in commonly assigned, copending U.S. patent application of J.C. Borowiec and S.A. El-Hamamsy, Ser. No. 472,144, filed Jan. 30, 1990, now U.S. Pat. No. 5,047,691 issued Sept. 10, 1991, which is hereby incorporated by reference, a capacitance connected in parallel with the excitation coil is needed to match the resistive component of the ballast load impedance, and a capacitance connected in series with the excitation coil is needed to obtain the proper phase angle. However, although the series and parallel tuning capacitances provide a matched impedance under lamp-operating, or running, conditions, the output impedance of the ballast load circuit is different under starting conditions. Furthermore, in order to ensure that enough power is provided to start the lamp, the ballast should be tuned under starting conditions. Thereafter, i.e. after the lamp has started, the ballast must be tuned under running conditions for maximum efficiency operation. Therefore, it is desirable to provide a means for automatically tuning the ballast load circuit as the output impedance thereof changes between starting and running conditions.

OBJECTS OF THE INVENTION

Accordingly, it is an object of the present invention to provide a new and improved variable capacitor.

Another object of the present invention is to provide a capacitor having a capacitance which is varied by piezoelectric actuating means for changing the distance between two conductive plates.

Still another object of the present invention is to provide a variable capacitor for automatically tuning the ballast load circuit of an electrodeless HID lamp system as the load impedance changes between starting and running conditions.

SUMMARY OF THE INVENTION

The foregoing and other objects of the present invention are achieved in a new and improved variable capacitor comprising a fixed conductive plate and a substantially parallel, movable conductive plate with a dielectric disposed therebetween. Piezoelectric actuating means is used to vary the distance between the conductive plates by moving the movable plate with respect to the fixed plate. As a result, capacitance changes in inverse proportion to the distance moved. In a preferred embodiment, a first conductive plate is fixed, and a second conductive plate is movable with respect to the fixed plate. In another preferred embodiment, only a portion of the second conductive plate is movable, while the remaining portion of the second plate and the first plate are fixed. A control signal is provided to activate the piezoelectric actuating means to move the movable conductive plate. The control signal may provide either discrete control for movement of the movable conductive plate between a discrete number of predetermined operating positions, or it may provide continuous control for movement over a range of positions; the appropriate type of control depends upon the application. Upon deactivation of the piezoelectric actuating means, the movable conductive plate is moved back to its original position.

A variable capacitor according to the present invention may be advantageously employed in the ballast of an electrodeless HID lamp system to automatically tune the ballast load circuit as the output impedance thereof changes between starting and running conditions. In a preferred embodiment, the variable capacitor comprises a tuning capacitor connected in series with the excitation coil of the lamp. The movable plate is initially in a lamp-starting position. A control signal is provided to the piezoelectric actuating means after an arc discharge is initiated, i.e. the lamp has started, thereby moving the movable conductive plate to a running position. Alternatively, the movable plate may be initially in the lamp-running position, and a control voltage may be provided to move the movable conductive plate to the lamp-starting position, if desired. In either case, the ballast load circuit is maintained in tune under both starting and running conditions, resulting in higher efficiency operation. Furthermore, if desired, a continuous control may be employed to ensure that the ballast load is maintained in tune during lamp operation by automatically adjusting for load impedance variations under running conditions.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
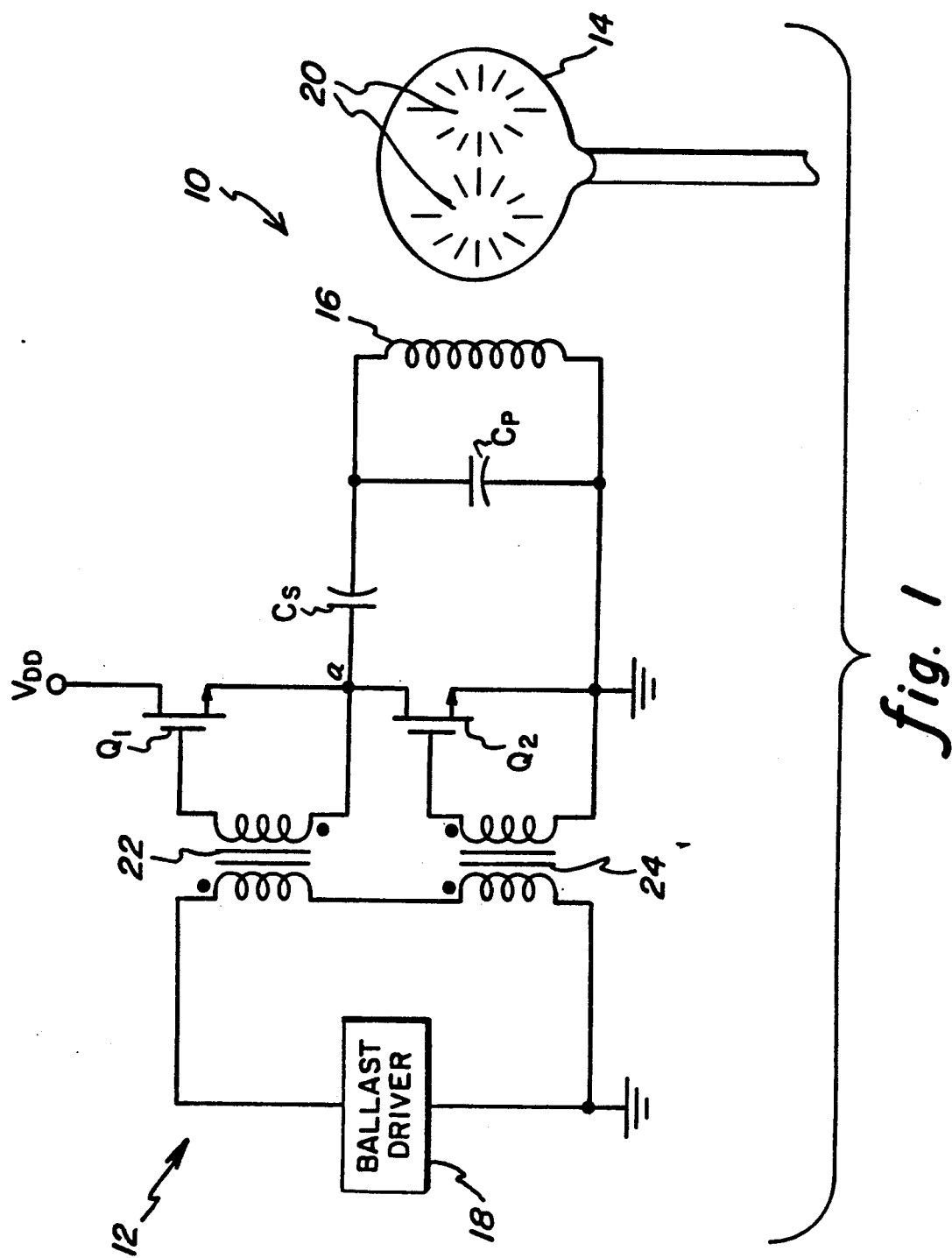
FIG. 1 is a schematic diagram of an electrodeless HID lamp and ballast.

FIG. 1 is a schematic diagram of an electrodeless HID lamp 10 and associated ballast 12, such as those described in the Borowiec and El-Hamamsy patent application, Ser. No. 472,144, now U.S. Pat. No. 5,047,692 issued Sept. 10, 1991 cited hereinabove. The HID lamp includes an arc tube 14 formed of a high temperature glass, such as fused quartz, or an optically transparent ceramic, such as polycrystalline alumina. By way of example, arc tube 14 is shown as having a substantially ellipsoid shape. However, arc tubes of other shapes may be desirable, depending upon the application. For example, arc tube 14 may be spherical or may have the shape of a short cylinder, or "pillbox", having rounded edges, if desired.

Arc tube 14 contains a fill in which a solenoidal arc discharge is excited during lamp operation. A suitable fill, described in commonly assigned U.S. Pat. No. 4,810,938 of P.D. Johnson, J.T. Dakin and J.M. Anderson issued on Mar. 7, 1989, comprises a sodium halide, a cerium halide and xenon combined in weight proportions to generate visible radiation exhibiting high efficacy and good color rendering capability at white color temperatures. For example, such a fill according to the Johnson et al. patent may comprise sodium iodide and cerium chloride, in equal weight proportions, in combination with xenon at a partial pressure of about 500 torr. The Johnson et al. patent is hereby incorporated by reference. Another suitable fill is described in U.S. Pat. No. 4,972,120 of H.L. Witting, issued Nov. 20, 1990, and assigned to the instant assignee, which patent is hereby incorporated by reference. The fill of the Witting patent comprises a combination of a lanthanum halide, a sodium halide, a cerium halide and xenon or krypton as a buffer gas. For example, a fill according to the Witting patent may comprise a combination of lanthanum iodide, sodium iodide, cerium iodide, and 250 torr partial pressure of xenon.

Electrical power is applied to the HID lamp by an excitation coil 16 disposed about arc tube 14 which is driven by an RF signal via a ballast driver 18 and ballast 12. (For clarity of illustration, coil 16 is not shown in its operational position about arc tube 14.) A suitable excitation coil 16 may comprise, for example, a two-turn coil having a configuration such as that described in commonly assigned, copending U.S. patent application of G.A. Farrall, Ser. No. 493,266, filed Mar. 14, 1990, now U.S. Pat. No. 5,039,903 issued Aug. 13, 1991, which patent is hereby incorporated by reference. Such a coil configuration results in very high efficiency and causes only minimal blockage of light from the lamp. The overall shape of the excitation coil of the Farrall application is generally that of a surface formed by rotating a bilaterally symmetrical trapezoid about a coil center line situated in the same plane as the trapezoid, but which line does not intersect the trapezoid. However, other suitable coil configurations may be used with the starting aid of the present invention, such as that described in commonly assigned U.S. Pat. No. 4,812,702 of J.M. Anderson, issued Mar. 14, 1989, which patent is hereby incorporated by reference. In particular, the Anderson patent describes a coil having six turns which are arranged to have a substantially V-shaped cross section on each side of a coil center line. Still another suitable excitation coil may be of solenoidal shape, for example.

In operation, RF current in coil 16 results in a time-varying magnetic field which produces within arc tube 14 an electric field that completely closes upon itself. Current flows through the fill within arc tube 14 as a result of this solenoidal electric field, producing a toroidal arc discharge 20 in arc tube 14. The operation of an exemplary electrodeless HID lamp is described in commonly assigned Dakin U.S. Pat. No. 4,783,615, issued on Nov. 8, 1988, which patent is hereby incorporated by reference.

As illustrated in FIG. 1, HID lamp ballast 12 comprises a Class-D power amplifier including two switching devices $Q_1$ and $Q_2$ connected in series with a dc power supply $V_{DD}$ in a half-bridge configuration. Switching devices $Q_1$ and $Q_2$ are illustrated as MOSFET's, but other types of switching devices having capacitive gates may be used, such as insulated gate bipolar transistors (IGBT's) or MOS-controlled thyristors (MCT's). Switching devices $Q_1$ and $Q_2$ are coupled to ballast driver 18 via input isolation transformers 22 and 24, respectively. In operation, the switching devices are driven alternately between cutoff and saturation such that one is conducting while the other one is turned off and vice versa. Hence, the Class-D ballast may be conveniently driven by a square wave signal. Alternatively, ballast driver 18 may comprise means for generating two out-of-phase sinusoidal signals, as described in U.S. patent application of S.A. El-Hamamsy and G. Jernakoff, Ser. No. 454,614, filed Dec. 21, 1989, now U.S. Pat. No. 5,023,566 issued June 11, 1991, which patent is hereby incorporated by reference.

A resonant load network is connected to the half-bridge at the junction between switching devices $Q_1$ and $Q_2$ and in parallel with switching device $Q_2$. The resonant load network comprises the excitation coil 16 of HID lamp 10 and a tuning capacitor $C_P$ connected in parallel therewith. The parallel combination of capacitor $C_P$ and coil 16 functions as an impedance transformer to reflect the impedance of the arc discharge 20 into the ballast load. A blocking/tuning capacitor $C_s$ is connected in series with the parallel combination of coil 16 and capacitor $C_P$. In particular, capacitor $C_s$ is used both for blocking dc voltage and for resonant circuit tuning.

Capacitors $C_s$ and $C_P$ are chosen to ensure impedance matching for maximum efficiency. That is, these capacitors are chosen to ensure that the ballast load is designed for optimum values of resistance and phase angle. As described in the Borowiec and El-Hamamsy patent application, Ser. No. 472,144, cited hereinabove, the excitation coil of the HID lamp acts as the primary of a loosely-coupled transformer, while the arc discharge acts as both a single-turn secondary and secondary load. The impedance of the arc discharge is reflected to the primary, or excitation coil, side of this loosely-coupled transformer. To match the ballast load impedance for maximum efficiency, the parallel capacitor operates with the excitation coil to match the proper resistive load value, and the series capacitor acts with the combination of the excitation coil and parallel capacitance to yield the required phase angle.

Figure 2A:
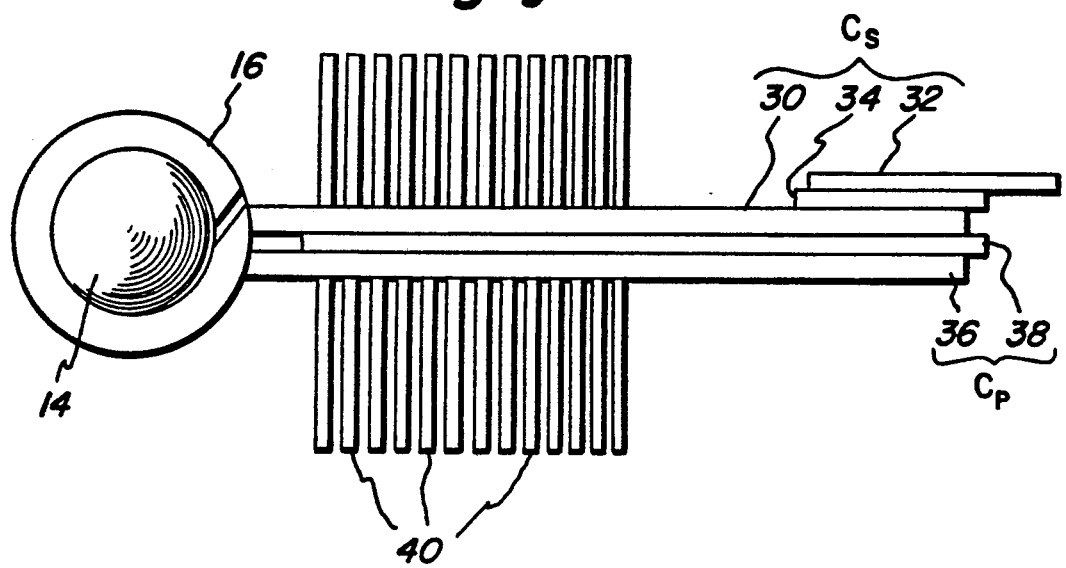
FIGS. 2a and 2b are top and side views, respectively, of an integrated tuning capacitor network useful in an electrodeless HID lamp ballast.
Figure 2B:
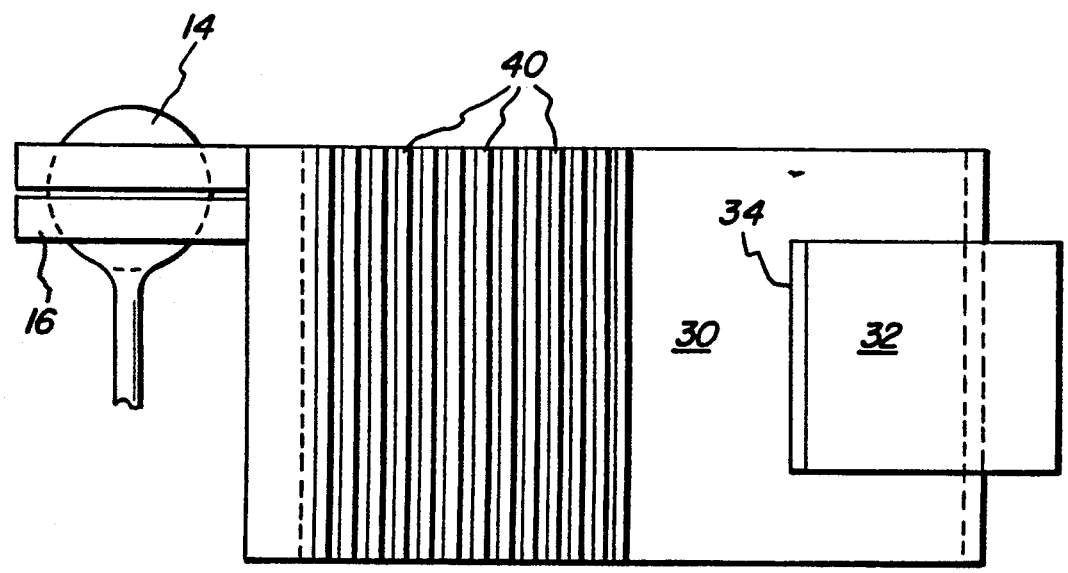

As illustrated in FIGS. 2a-2b and described in the Borowiec and El-Hamamsy patent application, Ser. No. 472,144, cited hereinabove, the capacitors $C_s$ and $C_P$ may be advantageously integrated by sharing a common conductive plate 30. Series capacitor $C_s$ further comprises another capacitor plate 32 separated from common plate 30 by a dielectric material 34. Parallel capacitor $C_P$ further comprises another capacitor plate 36 likewise separated from common plate 30 by a dielectric material 38. Suitable dielectric materials include Teflon synthetic resin polymer, mica, and Kapton polyimide film, while capacitor plates 30, 32, and 36 comprise a metal such as, for example, copper or aluminum. The capacitive value of series capacitor $C_s$ required for impedance matching is typically much less than that of parallel capacitor $C_P$; hence, series capacitor plate 32 may have less surface area than each of plates 30 and 36 of parallel capacitor $C_P$. For example, series capacitor plate 32 may have 25% of the surface area of each of the parallel capacitor plates 30 and 36.

Advantageously, by so integrating series capacitor $C_s$ and parallel capacitor $C_P$, the number of electrical leads and connections is minimized, thus reducing resistive losses, while visible light output and coil efficiency are improved. Furthermore, as described in the Borowiec and El-Hamamsy patent application, cited hereinabove, the integrated capacitor structure may be integrated with a heat sink that is provided for removing excess heat from the excitation coil. In particular, the common capacitor plate 30 and the parallel capacitor plate 36 together comprise heat sink planes of a heat sink. Additionally, heat sink fins 40 are preferably mounted to the heat sink planes 30 and 36 for more efficient heat removal.

Figure 3A:
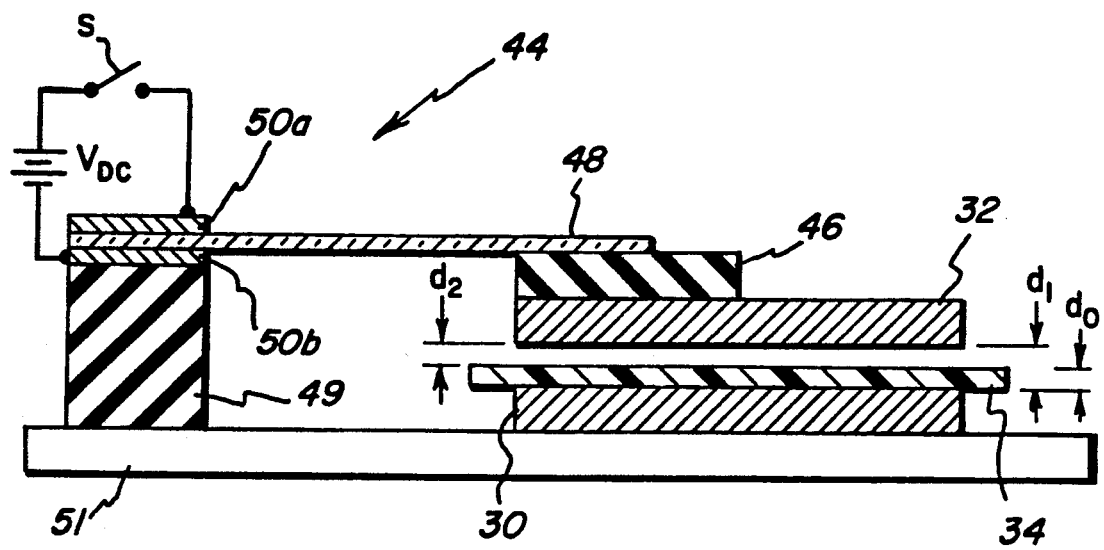
FIGS. 3a and 3b are side views of a variable capacitor in accordance with a preferred embodiment of the present invention.
Figure 3B:
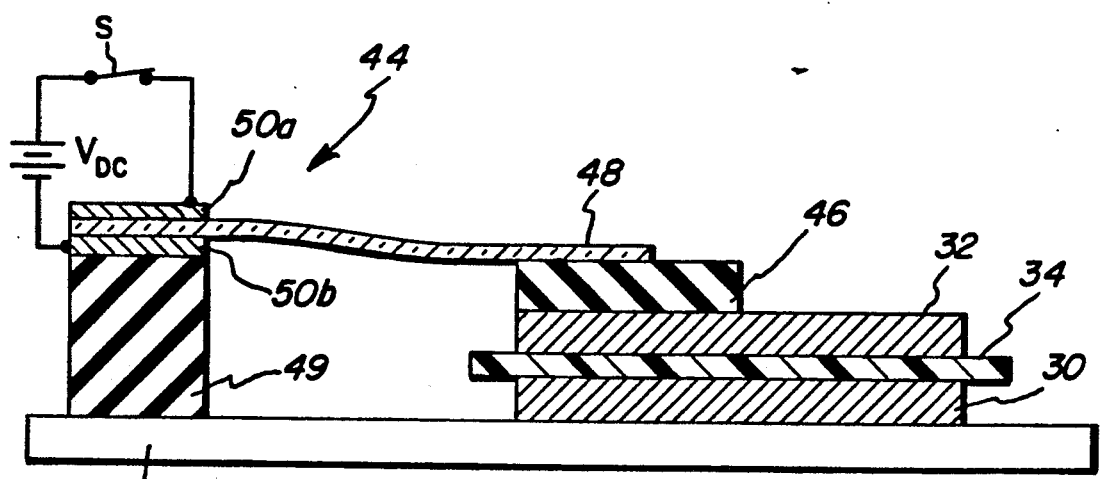

In accordance with the present invention, as illustrated in FIGS. 3a and 3b, conductive plate 30 is fixed, while conductive plate 32 of capacitor $C_s$ is movable by a piezoelectric actuating means coupled thereto. The piezoelectric actuating means for moving plate 32 comprises a piezoelectric bender 44 coupled to movable plate 32 by a rigid, insulating support 46. Piezoelectric bender 44 has a piezoelectric ceramic core 48 situated between a first electrode 50a and a second electrode 50b. Another insulating support 49 is provided for supporting the other end of piezoelectric bender 44. For illustrative purposes, support 49 and fixed plate 30 are shown in FIG. 3a as being mounted on a circuit board 51. Initially, bender 44 is positioned and configured as shown in FIG. 3a, so that plate 32 is in a first position at a distance $d_1$ away from fixed plate 30. When an actuating DC voltage $V_{DC}$ of proper amplitude and polarity is applied to electrodes 50a and 50b, piezoelectric bender 44 bends downwardly, as illustrated in FIG. 3b, thereby moving conductive plate 32 of series capacitor $C_s$ to a second position with conductive plates 30 and 32 separated by a distance $d_0$, where distance $d_0$ is less than distance $d_1$. As shown, distance $d_0$ is preferably the thickness of dielectric 34. (For illustrative purposes, actuating voltage $V_{DC}$ is shown as being applied to electrodes 50a and 50b by virtue of the effect of closing a switch S.) By so changing the distance between plates 30 and 32, the capacitance of capacitor $C_s$ changes by a predetermined amount. In particular, as is well-known in the art, capacitance $C_s$ of a capacitor is determined according to the following expression:

$$C_s = \epsilon_0 \epsilon_r \frac{A}{d_0},$$

where $\epsilon_0$ is the permittivity of free space; $\epsilon_r$ is the relative permittivity of the dielectric material; A is the surface area of the dielectric material between the conductive plates; and $d_0$ is the thickness of the dielectric between the conductive plates. When conductive plate 32 is moved with respect to conductive plate 30, and hence dielectric 34, the new capacitance value $C_s'$ is determined according to the following equation:

$$C_s' = \frac{\epsilon_0 A}{\left(\dfrac{d_0}{\epsilon_r} + d_2\right)},$$

where $d_2$ is the distance moved. Hence, by changing the distance between the conductive plates of capacitor $C_s$ by a predetermined amount, the capacitance changes proportionately. Specifically, in FIG. 3, distance $d_1$ is shown as being greater than distance $d_0$. Therefore, when conductive plate 32 is moved by an amount $d_2$ from distance $d_1$ to distance $d_0$, the value of capacitor $C_s$ increases to value $C_s'$. If, on the other hand, it is desirable to decrease the value of $C_s$, the same principles may be applied to move conductive plate 32 from an initial position at distance $d_0$ from plate 30 to the position at distance $d_1$ by applying the actuating voltage $V_{DC}$ to bend piezoelectric bender 44 upwardly.

Ideally, capacitive plate 32 is still parallel to plate 30 after it is moved to the second position, as illustrated in FIG. 3b. In practice, however, piezoelectric bender 44 arches slightly so that capacitive plate 32 is slightly at an angle with respect to plate 30 after it is moved. However, the movement of piezoelectric bender 44, which is exaggerated in FIG. 3b, is typically on the order of a few mils. Hence, plates 30 and 32 remain substantially parallel, and the average distance therebetween determines the new capacitance value of capacitor $C_s$.

Figure 4:
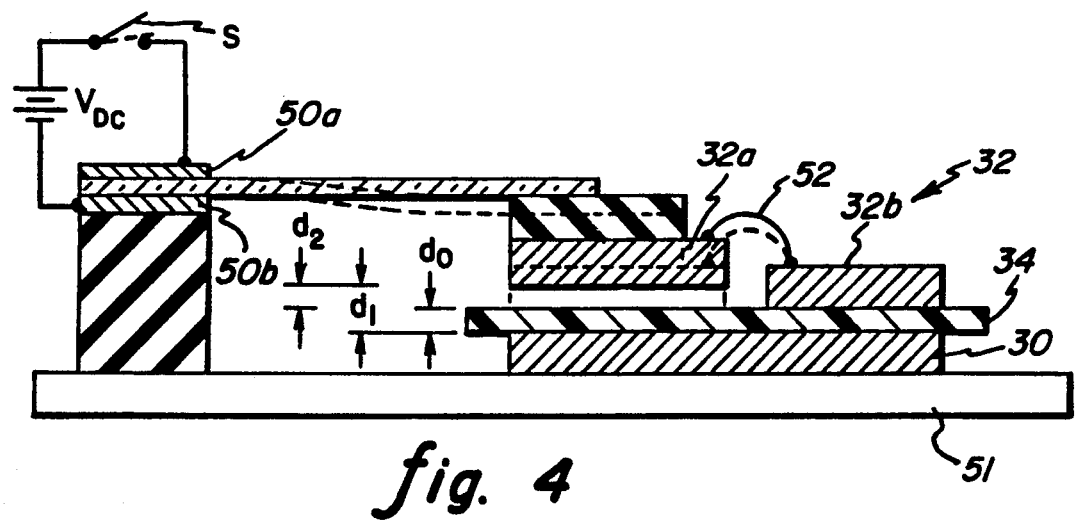
FIG. 4 is a side view of an alternative embodiment of a variable capacitor of the present invention.

FIG. 4 illustrates an alternative embodiment of the present invention wherein conductive plate 32 of capacitor $C_s$ as a movable portion 32a and a fixed portion 32b coupled to each other by a flexible, electrical connector 52. Initially, piezoelectric bender 44 is positioned and configured so that portion 32a of conductive plate 32 is at a distance $d_1$ from fixed plate 30. When actuating voltage $V_{DC}$ of proper amplitude and polarity is applied to electrodes 50a and 50b, piezoelectric bender 44 moves portion 32a of plate 32 downwardly by an amount $d_2$ (as shown in phantom in FIG. 4) so that plates 30 and 32 are separated by a distance $d_0$, i.e. the thickness of dielectric 34, thereby changing the capacitance of capacitor $C_s$, as desired.

Although FIGS. 3 and 4 illustrate discrete control of piezoelectric actuating means 48 such that movement of plate 32 (or plate portion 32a of FIG. 4) is between two discrete positions, one of ordinary skill in the art would appreciate that continuous control of piezoelectric actuating means 48 for movement of plate 32 over a range of positions is also possible. To this end, voltage $V_{DC}$ would be varied over a range of voltages with the result that the amount of bending of piezoelectric bender 44, and hence the distance moved by plate 32, would be proportional to the voltage applied thereto.

In accordance with another aspect of the present invention, variable capacitor $C_s$ is useful in an electrodeless HID lamp ballast, such as ballast 12 of FIG. 1. In one embodiment, variable capacitor $C_s$ is initially in the lamp-starting position, with piezoelectric bender 44 substantially straight, as illustrated in FIG. 3a, so that plates 30 and 32 are separated by a distance $d_1$. After arc discharge 20 is initiated in arc tube 14, i.e. the lamp has started, actuating voltage $V_{DC}$ is applied to electrodes 50a and 50b, as shown in FIG. 3b, in order to move piezoelectric bender 44 downwardly, thereby moving plate 32 of capacitor $C_s$ toward plate 30 to the lamp-running position, as illustrated in FIG. 4. In this way, the capacitance of capacitor $C_s$ is changed in order to ensure that the output impedance of ballast 12 (FIG. 1) is in tune under both starting and operating conditions, thus maximizing lamp efficiency. When the actuating voltage is sufficiently reduced or removed, piezoelectric bender 44 moves plate 32 back to the lamp-starting position. (Alternatively, if desired, bender 44 could be initially positioned and configured so as to require the application of actuating voltage $V_{DC}$ in order to move bender 44 upwardly to the lamp-starting position and hence the reduction or removal of voltage $V_{DC}$ in order to move bender 44 back to the lamp-running position.)

As described hereinabove in reference to FIGS. 3 and 4, continuous control of piezoelectric actuating means 48 is also possible such that movement of plate 32 occurs over a range of positions, rather than merely between two discrete positions, such as the hereinabove described starting and running positions. Hence, for variations in ballast load impedance during lamp operation, in addition to the hereinabove described variation between starting and running conditions generally, movement of plate 32 can depend on variation of voltage $V_{DC}$ over a range of voltages. In particular, the amount of bending of piezoelectric bender 44, and hence the distance moved by plate 32, would be proportional to the voltage applied thereto.

Figure 5:
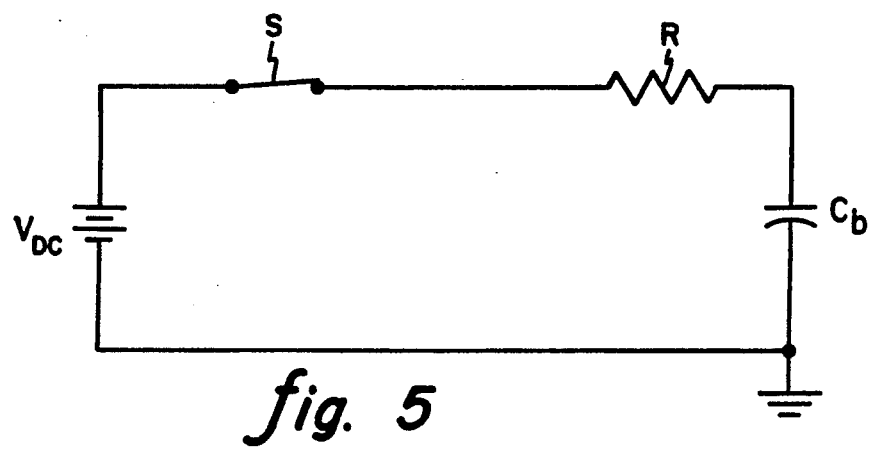
FIG. 5 is a schematic illustration of a circuit useful in generating the control voltage for varying the capacitance of a piezoelectrically actuated variable capacitor in accordance with an alternative embodiment of the present invention.
Figure 6:
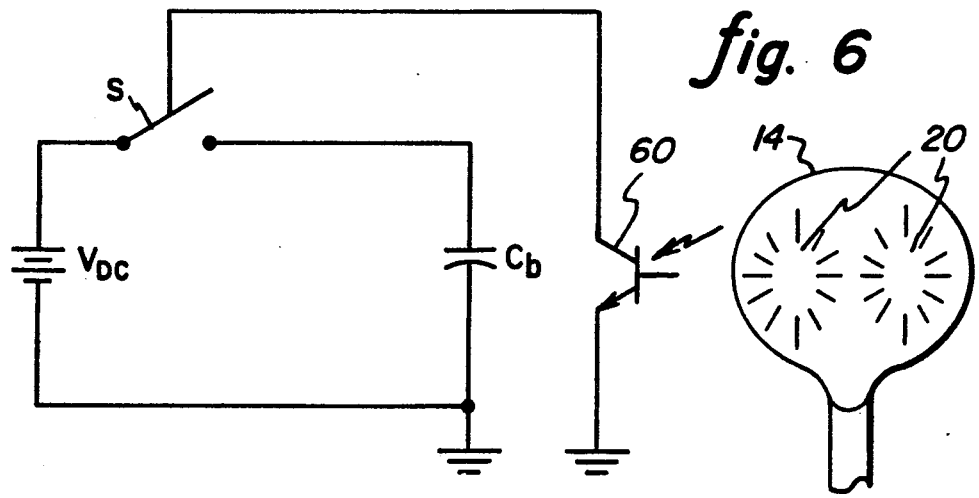
FIG. 6 is a schematic illustration of a circuit useful in generating the control voltage for varying the capacitance of a piezoelectrically actuated variable capacitor in accordance with an alternative embodiment of the present invention.

Some electrodeless HID lamps employ starting aids for initiating an arc discharge in the arc tube of the lamp. Such a starting aid may be fixed or movable between a lamp-starting position near the arc tube and a lamp-operating position away from the arc tube. Exemplary starting aids are described in Witting U.S. Pat. No. 4,902,937, issued Feb. 20, 1990; Witting U.S. Pat. No. 4,894,590, issued Jan. 16, 1990; Borowiec U.S. Pat. No. 4,894,589, issued Jan. 16, 1990; Witting U.S. patent application, Ser. No. 417,404, filed Oct. 5, 1989, now U.S. Pat. No. 4,982,140 issued Jan. 1, 1991; El-Hamamsy and Roberts U.S. patent application, Ser. No. 07/527,582; and Roberts, El-Hamamsy and Thomas U.S. Pat. application, Ser. No. 07/527,502, now U.S. Pat. No. 5,047,693 issued Sept. 10, 1991. The above-listed starting aid references are each assigned to the instant assignee and are incorporated by reference herein. In accordance with the present invention, for an electrodeless HID lamp system employing a movable starting aid, such as the piezoelectrically-located starting electrodes described in Borowiec U.S. Pat. No. 4,894,589, cited hereinabove, the control signal to the starting aid can advantageously be the same as that used to activate the piezoelectric actuating means for varying capacitance $C_s$. On the other hand, for an electrodeless HID lamp system employing a fixed starting aid, such as those described in the El-Hamamsy and Roberts U.S. patent application, Ser. No. 07/527,503 and the Roberts, El-Hamamsy and Thomas U.S. patent application, Ser. No. 07/527,502, now U.S. Pat. No. 5,047,693 issued Sept. 10, 1991, the movement of piezoelectric bender 44 to the lamp-running position must be delayed until after the lamp has started. To implement such a delay, a resistor R may be placed effectively in series with the piezoelectric bender capacitance $C_b$ to delay the charging thereof, as illustrated in the schematic diagram of FIG. 5. Alternative means for detecting whether the lamp has started, and thus determining when to activate the piezoelectric actuating means, may include, for example, the use of photodetectors or load current measurements. In FIG. 6, for example, a light-sensitive transistor 60 of a type well-known in the art is employed to detect light emitted from arc tube 14. After the initiation of arc discharge 20 in the arc tube, i.e. upon receipt of sufficiently intense light rays from the arc tube, light-sensitive transistor 60 is turned on, causing switch S to close. With switch S closed, voltage $V_{DC}$ is applied to piezoelectric bender 44 to move it to the lamp-running position in the manner described hereinabove.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A ballast for an electrodeless high intensity discharge lamp of the type having an excitation coil situated about an arc tube for exciting an arc discharge therein upon application of a radio frequency signal to said excitation coil, said ballast comprising:

first and second switching devices connected in series in a half-bridge configuration with a junction therebetween;

ballast drive means coupled to said first and second switching devices, said ballast drive means being adapted to be coupled to an RF power supply for alternately driving said first and second switching devices;

resonant circuit means coupled to said first and second switching devices at the junction therebetween, said resonant circuit means comprising said excitation coil, a parallel capacitor in parallel combination with said excitation coil, and a series capacitor coupled in series with said parallel combination, said parallel and series capacitors each comprising first and second conductive plates with a dielectric disposed therebetween, said second conductive plate of said series capacitor being separated by a first predetermined distance from said first conductive plate thereof during initiation of the arc discharge so that the ballast is in tune under lamp-starting conditions; and piezoelectric actuating means for moving at least a portion of said second conductive plate of said series capacitor with respect to said first conductive plate thereof, after initiation of the arc discharge, in response to a control voltage, so that the ballast is in tune under lamp-running conditions.

2. The ballast of claim 1 wherein said first conductive plate is common to said series and parallel capacitors so as to comprise one of the conductive plates thereof.

3. The ballast of claim 1 wherein said control voltage is variable over a preselected range of voltages and the capacitance of said series capacitor changes in proportion thereto.

4. The ballast of claim 1 wherein said second conductive plate of said series capacitor is initially positioned at said first predetermined distance from said first conductive plate thereof and is moved to a running position at a second predetermined distance from said first conductive plate of said series capacitor in response to application of said control voltage, the running position being in closer proximity to said first conductive plate of said series capacitor than the initial position, said second conductive plate of said series capacitor being moved back to the initial position upon sufficient reduction in said control voltage.

5. The ballast of claim 1 wherein said second conductive plate of said series capacitor is initially positioned in a running position at a second predetermined distance from said first conductive plate thereof and is moved said first predetermined distance in response to application of said control voltage, the running position being in closer proximity to said first conductive plate of said series capacitor than said first predetermined distance, said second conductive plate of said series capacitor being moved back to said running position after initiation of the arc discharge upon sufficient reduction in said control voltage.

6. The ballast of claim 2 wherein said control voltage is variable over a preselected range of voltages and the capacitance of said series capacitor changes in proportion thereto.

7. The ballast of claim 2 wherein said second conductive plate of said series capacitor is initially positioned at said first predetermined distance from said first conductive plate thereof and is moved to a running position at a second predetermined distance from said first conductive plate of said series capacitor in response to application of said control voltage, the running position being in closer proximity to said first conductive plate of said series capacitor than the initial position, said second conductive plate of said series capacitor being moved back to the initial position upon sufficient reduction in said control voltage.

8. The ballast of claim 2 wherein said second conductive plate of said series capacitor is initially positioned in a running position at a second predetermined distance from said first conductive plate thereof and is moved said first predetermined distance in response to application of said control voltage, the running position being in closer proximity to said first conductive plate of said series capacitor than said first predetermined distance, said second conductive plate of said series capacitor being moved back to said running position after initiation of the arc discharge upon sufficient reduction in said control voltage.

9. An electrodeless high intensity discharge lamp system, comprising:

an electrodeless high intensity discharge lamp including an excitation coil situated about an arc tube which contains a fill;

a ballast for providing a first radio frequency signal to said excitation coil for exciting an arc discharge in said arc tube, said ballast including first and second switching devices connected in series in a high-bridge configuration with a junction therebetween, said ballast further including resonant circuit means coupled to said first and second switching devices at the junction. therebetween, said resonant circuit means encompassing said excitation coil and further including a parallel capacitor in parallel combination with said excitation coil, and a series capacitor coupled in series with said parallel combination, said parallel and series capacitors each comprising first and second conductive plates with a dielectric therebetween, said second conductive plate of said series capacitor being separated by a first predetermined distance from said first conductive plate thereof so that the ballast is in tune under lamp-starting conditions;

first piezoelectric actuating means for moving at least a portion of said second conductive plate of said series capacitor with respect to said first conductive plate thereof in response to a control voltage so that the ballast is in tune under lamp-running conditions; and at least one starting electrode disposed proximate said arc tube at least during initiation of the arc discharge therein.

10. The lamp system of claim 9 wherein said first conductive plate is common to said series and parallel capacitors so as to comprise one of the conductive plates thereof.

11. The lamp system of claim 9 wherein said control voltage is variable over a preselected range of voltages and the capacitance of said series capacitor changes in proportion thereto.

12. The lamp system of claim 9 wherein said second conductive plate of said series capacitor is initially positioned at said first predetermined distance from said first conductive plate thereof and is moved to a running position at a second predetermined distance from said first conductive plate of said series capacitor in response to application of said control voltage, the running position being in closer proximity to said first conductive plate of said series capacitor than the initial position, said second conductive plate of said series capacitor being moved back to the initial position upon sufficient reduction in said control voltage.

13. The lamp system of claim 9 wherein said second conductive plate of said series capacitor is initially positioned in a running position at a second predetermined distance from said first conductive plate thereof and is moved said first predetermined distance in response to application of said control voltage, the running position being in closer proximity to said first conductive plate of said series capacitor than said first predetermined distance, said second conductive plate of said series capacitor being moved back to said running position after initiation of the arc discharge upon sufficient reduction in said control voltage.

14. The lamp system of claim 9, further comprising:
second piezoelectric actuating means for moving said starting electrode between a lamp-starting position adjacent to the arc tube and a lamp-operating position away from the arc tube in response to said control voltage.

15. The lamp system of claim 14 wherein said starting electrode is fixed and said lamp system further comprises delay circuit means for delaying activation of said first piezoelectric actuating means until after the arc discharge is initiated in said arc tube.

16. The lamp system of claim 15 wherein said delay circuit means comprises a resistance coupled in series with a capacitance.

17. The lamp system of claim 15 wherein said delay circuit means comprises photodetector means for detecting initiation of the arc discharge.

18. The lamp system of claim 10 wherein said control voltage is variable over a preselected range of voltages and the capacitance of said series capacitor changes in proportion thereto.

19. The lamp system of claim 10 wherein said second conductive plate of said series capacitor is initially positioned at said first predetermined distance from said first conductive plate thereof and is moved to a running position at a second predetermined distance from said first conductive plate of said series capacitor in response to application of said control voltage, the running position being in closer proximity to said first conductive plate of said series capacitor than the initial position, said second conductive plate of said series capacitor being moved back to the initial position upon sufficient reduction in said control voltage.

20. The lamp system of claim 10 wherein said second conductive plate of said series capacitor is initially positioned in a running position at a second predetermined distance form said first conductive plate thereof and is moved said first predetermined distance in response to application of said control voltage, the running position being in closer proximity to said first conductive plate of said series capacitor than said first predetermined distance, said second conductive plate of said series capacitor being moved back to said running position after initiation of the arc discharge upon sufficient reduction in said control voltage.

* * * * *